L. ADAMS.
SEED CORN DRYING RACK.
APPLICATION FILED MAY 2, 1916.

1,206,770.

Patented Nov. 28, 1916.

Inventor
Lee Adams
By L. B. James
Attorney

UNITED STATES PATENT OFFICE.

LEE ADAMS, OF JACKSONVILLE, ILLINOIS, ASSIGNOR OF ONE-HALF TO THOMAS WILLERTON, OF JACKSONVILLE, ILLINOIS.

SEED-CORN-DRYING RACK.

1,206,770.  Specification of Letters Patent.  Patented Nov. 28, 1916.

Application filed May 2, 1916. Serial No. 94,919.

*To all whom it may concern:*

Be it known that I, LEE ADAMS, a citizen of the United States, residing at Jacksonville, in the county of Morgan and State of Illinois, have invented certain new and useful Improvements in Seed-Corn-Drying Racks, of which the following is a specification.

This invention relates to drying racks and more particularly to seed corn drying racks.

The primary object of this invention resides in the provision of a seed corn drying rack which will permit a free circulation of air between the several ears of corn supported thereby.

Another object of this invention resides in the provision of a seed corn drying rack consisting of a certain combination of elements whereby the corn placed thereon will be preserved in a sanitary condition during the storage of the same.

Another object of this invention resides in the provision of a seed corn drying rack consisting of a certain combination of elements which co-act in sustaining the weight of the several ears of corn placed on each shelf of the rack.

A still further object of this invention resides in the provision of a seed corn drying rack which has its weight and cost of manufacture reduced to a minimum.

Figure 1:
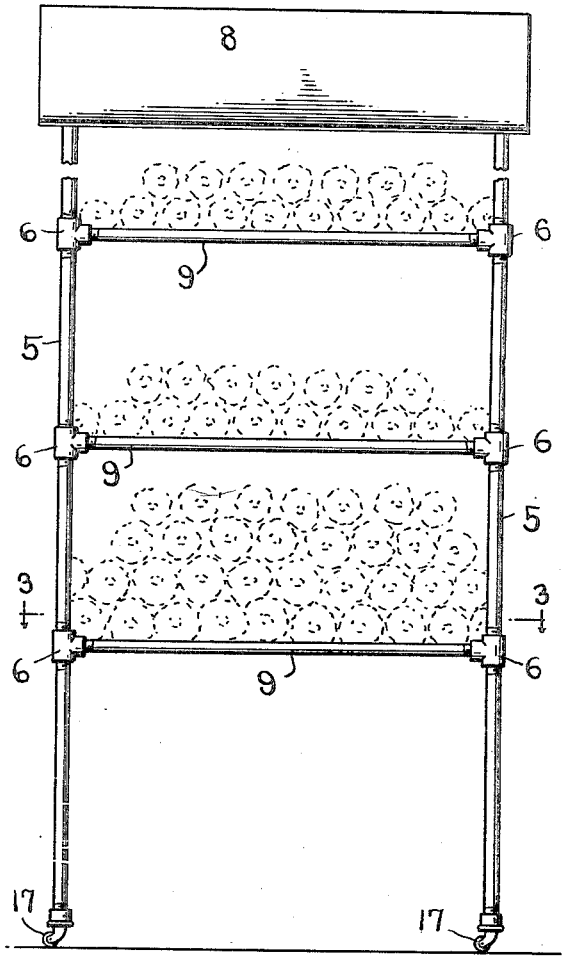
Figure 2:
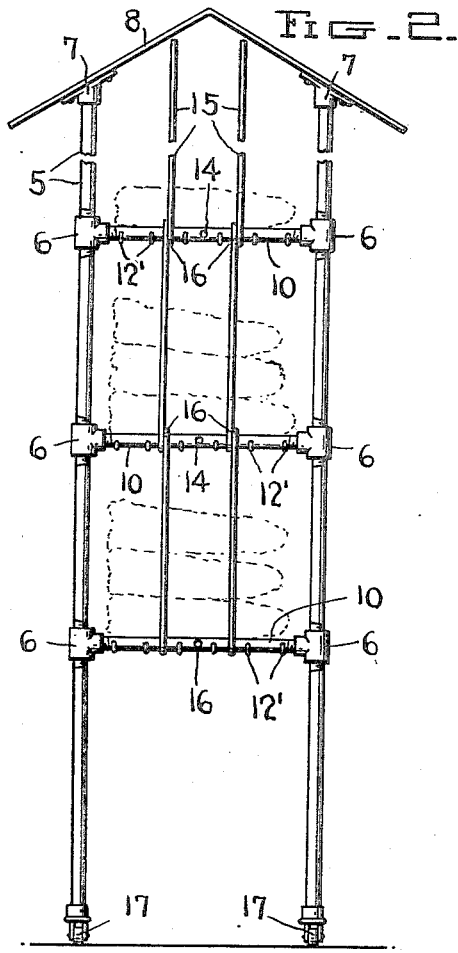
Figure 3:
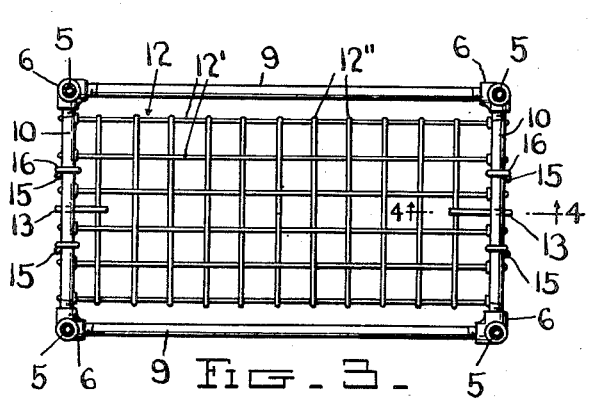
Figure 4:
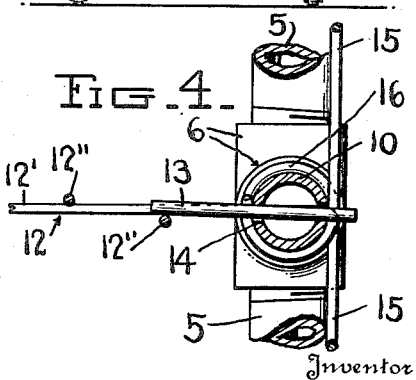

In the accompanying drawing; Figure 1 is a side view of a seed corn drying rack constructed in accordance with this invention; Fig. 2 is an end view thereof; Fig. 3 is a horizontal sectional view on line 3—3 of Fig. 1; and Fig. 4 is a detail sectional view on line 4—4 of Fig. 3.

Referring to the present embodiment of this invention, the numeral 5 designates a series of standards which consists of several alining sections secured together by couplings 6. Supported upon the uppermost sections of said standards 5 as by brackets 7 is a cover 8 which in this instance is of the gable type but may be replaced with any other approved type.

Connecting the aforesaid standards 5 by threaded engagement with the coupling 6 is a series of side rails 9 and end rails 10, the former of which being employed to rigidly retain the standards in spaced relation to one another, while the latter are utilized for a twofold purpose, to wit, to further assemble the standards into a rigid frame and reduce the sagging of the shelves 12 to a minimum.

The above mentioned shelves are preferably formed of coarse wire mesh with their longitudinal strands of wire 12′ passed through apertures in said end rails 10 and securely retained against accidental disengagement therefrom.

With the above mentioned end rails rotatable in their respective couplings and the longitudinal strands of wire of the shelves securely fastened to said end rails, it will be obvious that the shelves can be maintained in a horizontal position, by inserting the rods 13 through the apertures 14 in said end rails, whereupon the end rails can be readily rotated and the secured ends of the wire strands 12′ of the shelves wound upon the peripheries of the end rails until sufficient tension is attained to support the weight of the corn piled thereon after which the rods are allowed to remain in engagement with the end rails and bear against the adjacent laterally extending wire strands 12″ of the shelves to prevent a retrograde movement of the end rails.

To prevent the corn from rolling off the ends of the shelves, a series of strong wire guards 15 are provided which have their intermediate portions and one of their ends provided with loops 16 for loose engagement with the end rails 10.

In the present illustration of this rack, I have provided the standards 5 with rollers 17 to permit the same to be moved from place to place without having to employ more than one person.

I claim:

1. In a seed corn rack, the combination of a series of standards, side and end rails connecting said standards, shelves supported by said end rails and means for rotating said end rails and stretching said shelves.

2. In a seed corn rack, the combination of a series of standards, immovable side rails connecting said standards, rotatable end rails further connecting said standards, shelves supported by said end rails, guards supported by said end rails and rods engaging said end rails for rotating the same and maintaining said shelves in a horizontal position.

3. In a seed corn rack, the combination of a series of standards, spaced couplings carried by said standards, side rails secured to said couplings, end rails rotatably secured to said couplings at right angles to said side rails, wire-mesh shelves secured to said end rails by their longitudinally extending strands of wire, guards disposed at the ends of said shelves and loosely secured to said end rails, and rods slidably engaging apertures in said end rails and bearing against the adjacent lateral strands of wire of said shelves.

4. In a seed corn drying rack, the combination of a multiplicity of shelves, rotatable end rails supporting said shelves, standards supporting said end rails, and means carried by said end rails for maintaining said shelves in a stretched condition.

5. In a seed corn drying rack, the combination of a multiplicity of shelves, supports therefor, and means for tensioning the shelves between said supports.

In testimony whereof I affix my signature in the presence of two witnesses.

LEE ADAMS.

Witnesses:
ILA FERREIRA,
PEARL FROST.